(12) United States Patent
Watanabe et al.

(10) Patent No.: US 12,474,559 B2
(45) Date of Patent: Nov. 18, 2025

(54) OBJECTIVE LENS, OPTICAL SYSTEM, AND MICROSCOPE

(71) Applicant: NIKON CORPORATION, Tokyo (JP)

(72) Inventors: Katsuya Watanabe, Yokohama (JP); Azuna Nonaka, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 18/240,658

(22) Filed: Aug. 31, 2023

(65) Prior Publication Data

US 2023/0408804 A1 Dec. 21, 2023

Related U.S. Application Data

(63) Continuation of application No. 16/595,673, filed on Oct. 8, 2019, now Pat. No. 11,782,253, which is a (Continued)

(30) Foreign Application Priority Data

May 11, 2017 (JP) ................. 2017-094453

(51) Int. Cl.
*G02B 21/02* (2006.01)
*G02B 9/14* (2006.01)
*G02B 21/33* (2006.01)

(52) U.S. Cl.
CPC ............ *G02B 21/02* (2013.01); *G02B 9/14* (2013.01); *G02B 21/33* (2013.01)

(58) Field of Classification Search
CPC ............ G02B 21/02; G02B 21/00–368; G02B 25/00; G02B 25/001; G02B 9/12;
(Continued)

(56) References Cited

U.S. PATENT DOCUMENTS 5,530,590 A * 6/1996 Saito ................. G02B 27/0068
359/657
2002/0089760 A1 7/2002 Yamaguchi
(Continued)

FOREIGN PATENT DOCUMENTS

JP 2002-341249 A 11/2002
JP 2003-15046 A 1/2003
(Continued)

OTHER PUBLICATIONS

Jul. 17, 2018 International Search Report issued in International Patent Application No. PCT/JP2018/017969.
(Continued)

*Primary Examiner* — Cara E Rakowski
(74) *Attorney, Agent, or Firm* — Oliff PLC

(57) ABSTRACT

An objective lens (OL) comprises, disposed in order from an object: a positive lens (L11); a negative meniscus lens (L12) cemented to the positive lens (L11) and having a concave surface facing the object; and a positive meniscus lens (L13) having a concave surface facing the object; wherein the objective lens satisfies following conditional expressions $2.03 \leq n1m \leq 2.30$ and $20 \leq v1m$, where, n1m: a refractive index of the negative meniscus lens (L12) with respect to a d-line, and v1m: an Abbe number of the negative meniscus lens (L12).

8 Claims, 10 Drawing Sheets

Related U.S. Application Data continuation of application No. PCT/JP2018/017969, filed on May 9, 2018.

(58) Field of Classification Search
CPC ... G02B 9/14; G02B 9/16; G02B 9/18; G02B 9/20; G02B 9/22; G02B 9/24; G02B 9/26; G02B 9/28; G02B 9/30; G02B 9/34; G02B 9/60; G02B 9/62; G02B 9/64; G01B 9/04
USPC .............. 359/368–398, 643–647, 656–661
See application file for complete search history.

(56) References Cited

U.S. PATENT DOCUMENTS

| | | |
|---|---|---|
| 2003/0076600 A1 | 4/2003 | Watanabe |
| 2006/0082896 A1 | 4/2006 | Mandai et al. |
| 2010/0265574 A1 | 10/2010 | Kasahara |
| 2013/0271829 A1 | 10/2013 | Kasahara |
| 2015/0109681 A1 | 4/2015 | Konishi |
| 2015/0109682 A1 | 4/2015 | Kasahara |
| 2016/0194237 A1* | 7/2016 | Negishi .................. G02B 1/00 501/78 |
| 2018/0016182 A1* | 1/2018 | Sun ..................... G02B 3/0087 |

FOREIGN PATENT DOCUMENTS

| | | |
|---|---|---|
| JP | 2006-113287 A | 4/2006 |
| JP | 2010-271693 A | 12/2010 |
| JP | 2011-75982 A | 4/2011 |
| JP | 2015-079144 A | 4/2015 |
| JP | 2015-079222 A | 4/2015 |

OTHER PUBLICATIONS

Dec. 10, 2020 Extended Search Report issued in European Patent Application No. 18797560.2.
Aug. 23, 2021 Office Action issued in U.S. Appl. No. 16/595,673.
Nov. 24, 2021 Office Action issued in U.S. Appl. No. 16/595,673.
Dec. 28, 2021 Office Action issued in Japanese Patent Application No. 2019-517669.
Sep. 6, 2022 Office Action issued in European Patent Application No. 18797560.2.
Dec. 23, 2022 Office Action issued in U.S. Appl. No. 16/595,673.
Feb. 28, 2023 Notice of Reasons for Refusal issued in Japanese Patent Application No. 2022-098655.
Jul. 15, 2022 Office Action issued in U.S. Appl. No. 16/595,673.
Jun. 13, 2023 Notice of Allowance issued in U.S. Appl. No. 16/595,673.

* cited by examiner

OBJECTIVE LENS, OPTICAL SYSTEM, AND MICROSCOPE

RELATED APPLICATIONS

This is a continuation application of U.S. patent application Ser. No. 16/595,673 filed on Oct. 8, 2019, which is a continuation of PCT International Application No. PCT/JP2018/017969, filed on May 9, 2018. Each of these applications are hereby incorporated by reference. This application also claims the benefit of Japanese Patent Application No. 2017-094453, filed in Japan on May 11, 2017, which is hereby incorporated by reference.

TECHNICAL FIELD

The present invention relates to an objective lens, an optical system, and a microscope.

TECHNICAL BACKGROUND

Regarding the use of optical microscopes in the field of biology, in addition to conventional observation of so-called fixed samples, which are cells, tissue slices, etc. having undergone chemical treatment with formaldehyde, etc., the importance of observation of biological samples, in which changes in the form or behavior of living cells are captured, has been recently rising. In observation of biological samples, a large field view, a high numerical aperture, and a sufficiently long working distance are desired, and immersion microscope objective lenses for meeting these demands have been invented (for example, see Patent literature 1).

PRIOR ARTS LIST

Patent Document

Patent literature 1: Japanese Laid-Open Patent Publication No. 2010-271693 (A)

SUMMARY OF THE INVENTION

An objective lens according to a first mode comprises, disposed in order from an object: a positive lens; a negative meniscus lens cemented to the positive lens and having a concave surface facing the object; and a positive meniscus lens having a concave surface facing the object; wherein the objective lens satisfies following conditional expressions $2.03 \leq n1m \leq 2.30$ and $20 \leq v1m$, where, n1m: a refractive index of the negative meniscus lens with respect to a d-line, and
v1m: an Abbe number of the negative meniscus lens.

An optical system according to a second mode comprises the objective lens of the first mode and an image forming lens.

A microscope according to a third mode comprises the objective lens of the first mode.

DESCRIPTION OF THE EMBODIMENT

Hereinafter, immersion microscope objective lenses and microscopes of a present embodiment will be described with reference to drawings. In the present embodiment, the immersion microscope objective lenses, which have a large field view and a sufficient working distance and are capable of obtaining good optical performance even at the periphery of the field view while maintaining a comparatively high numerical aperture, will be described.

Figure 1:
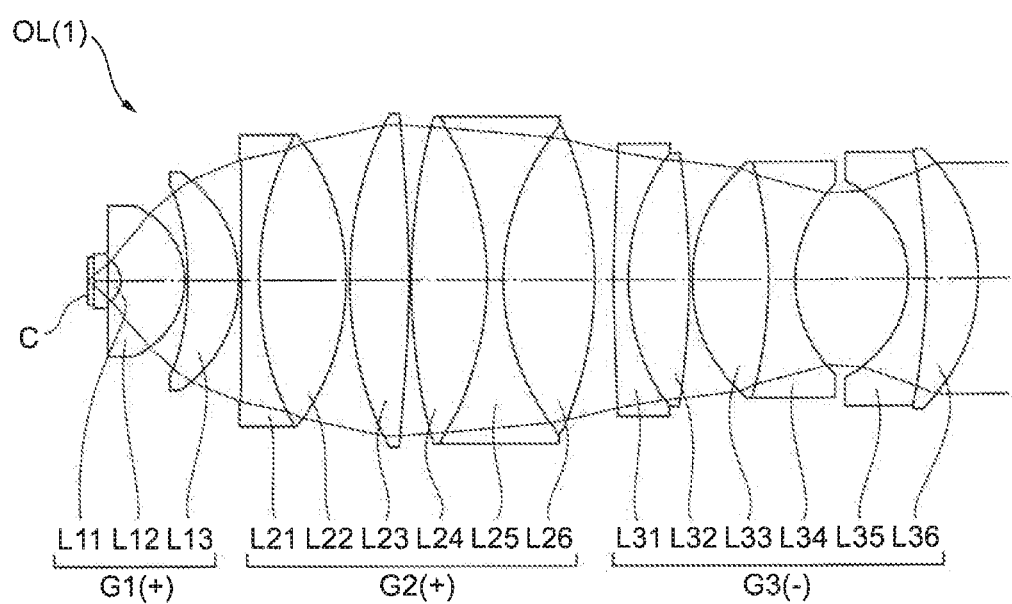
FIG. 1 is a cross-sectional view showing the configuration of an immersion microscope objective lens according to Example 1.
Figure 3:
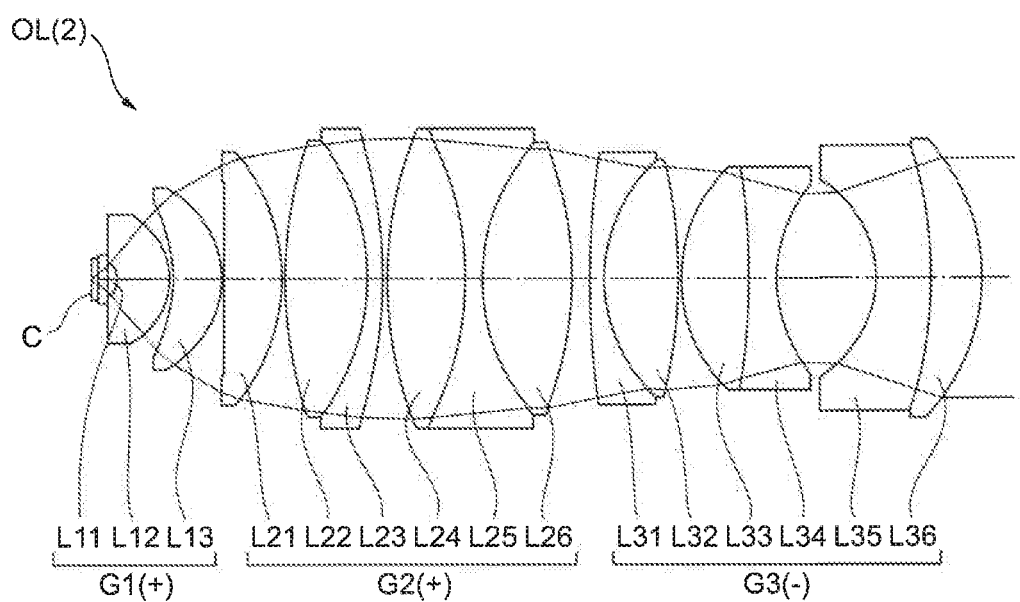
FIG. 3 is a cross-sectional view showing the configuration of an immersion microscope objective lens according to Example 2.
Figure 5:
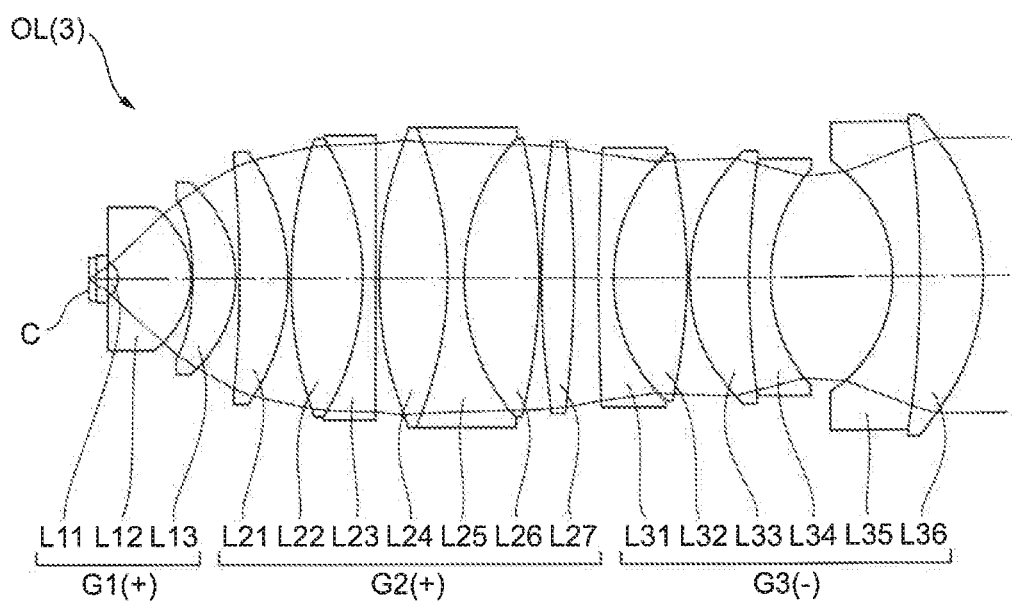
FIG. 5 is a cross-sectional view showing the configuration of an immersion microscope objective lens according to Example 3.
Figure 7:
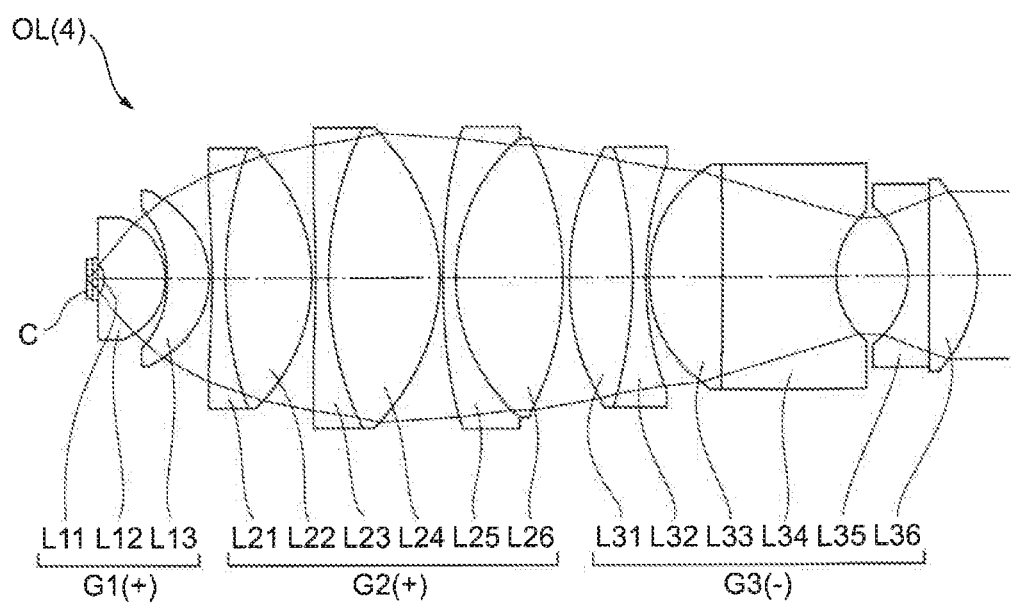
FIG. 7 is a cross-sectional view showing the configuration of an immersion microscope objective lens according to Example 4.

As an example of the immersion microscope objective lens OL according to the present embodiment, an immersion microscope objective lens OL (1) shown in FIG. 1 comprises, disposed in order from an object: a positive lens L11, which is plano-convex or has a small object-side curvature (so that it is close to a flat surface); a negative meniscus lens L12 cemented to the positive lens L11 and having a concave surface facing the object; and a positive meniscus lens L13 having a concave surface facing the object. The immersion microscope objective lens OL according to the present embodiment may be an immersion microscope objective lens OL (2) shown in FIG. 3, may be an immersion microscope objective lens OL (3) shown in FIG. 5, or may be an immersion microscope objective lens OL (4) shown in FIG. 7. Note that the lenses of the immersion microscope objective lenses OL (2) to OL (4) shown in FIG. 3, FIG. 5, and FIG. 7 are configured in the same manner as the immersion microscope objective lens OL (1) shown in FIG. 1.

Generally, in a high-NA objective lens of a dry type, the lens nearest to the object often consists of a single meniscus lens having a concave surface, which has a comparatively small radius of curvature and faces the object. By virtue of this, the incident angle of the light flux, which has a large angle spread from the object surface and is incident on the lens nearest to the object, is reduced to suppress occurrence of aberrations such as spherical aberrations. In addition, the Petzval sum is reduced by the concave surface of the lens nearest to the object to contribute to correction of field curvature.

On the other hand, in an immersion objective lens, the lens surface nearest to the object often consists of a flat surface or a gentle curve surface in order to facilitate cleaning of a front end and to prevent bubbles from being mixed in immersion liquid. If the shape of the lens nearest to the object is merely configured to be approximately plano-convex, the element of the negative refractive power which reduces the Petzval sum is lost. In view of this, there is a conceivable method in which an approximately plano-convex positive lens having a relatively low refractive index is cemented to a negative meniscus lens having a relatively high refractive index to ensure the negative refractive power by the cemented surface. By virtue of this, field curvature can be corrected. When an attempt is made to expand the field view and increase the working distance like the present embodiment, the effective diameter of the positive lens, which is nearest to the object, increases, and it becomes difficult to sufficiently reduce the radius of curvature of the cemented surface as a result. The refractive power of a lens surface is determined by the difference between the front/rear refractive indexes of the lens surface and the radius of curvature of the lens surface. If the difference between the refractive indexes of the positive lens and the negative meniscus lens is increased, the amount caused by the increase of the radius of curvature of the cemented surface can be canceled out. The refractive index of conventional glass is at most about 2.0, and therefore there has been a limit to increase the difference between the refractive indexes of the positive lens and the negative meniscus lens.

A new glass manufacturing method called levitation melting enables vitrification of unstable compositions, which had been difficult to be vitrified. As a result, manufacturing of glass that has a high refractive index, comparatively small dispersion, and a high transmission even at short wavelengths is becoming possible. If such high-refractive-index glass is used as a negative meniscus lens, the refractive index difference between the positive lens and the negative meniscus lens increases, and the amount caused by the increase of the radius of curvature of the cemented surface can be cancelled out. Therefore, the Petzval sum can be reduced.

In the immersion microscope objective lens OL according to the present embodiment, the diverging light flux emitted from the object transmits through the positive lens L11 and the negative meniscus lens L12 and is bent at the positive meniscus lens L13 toward the converging side. Since the positive meniscus lens L13 has comparatively large refractive power in order to suppress divergence of light flux, this lens is desired to be meniscus with a concave surface facing the object so that a large aberration does not occur.

The immersion microscope objective lens OL according to the present embodiment having the above described configuration satisfies following conditional expressions (1) and (2).

$$2.03 \leq n1m \leq 2.30 \tag{1}$$

$$20 \leq v1m \tag{2},$$

where, n1m: the refractive index of the negative meniscus lens L12 with respect to the d-line, and v1m: the Abbe number of the negative meniscus lens L12.

The conditional expression (1) is a conditional expression for defining an appropriate refractive index of the glass material used for the negative meniscus lens L12. If the corresponding value of the conditional expression (1) is lower than the lower limit, sufficient negative refractive power cannot be obtained at the cemented surface of the positive lens L11, which has an object-side lens surface contacting immersion liquid, and the negative meniscus lens L12. As a result, the Petzval sum cannot be sufficiently reduced, and flatness of an image surface is lowered, which is not preferred. In order to ensure the effects of the present embodiment, the lower limit of the conditional expression (1) may preferably be 2.05.

If the corresponding value of the conditional expression (1) is higher than the upper limit, the positive refractive power at the image-side lens surface of the negative meniscus lens L12 becomes too strong and cancels out the negative refractive power of the cemented surface of the positive lens L11 and the negative meniscus lens L12. As a result, the effect of reducing the Petzval sum is lowered, and flatness of the image surface is lowered, which is not preferred. In order to ensure the effects of the present embodiment, the upper limit of the conditional expression (1) may preferably be 2.20.

The conditional expression (2) is a conditional expression for defining an appropriate Abbe number of the glass material used for the negative meniscus lens L12. If the corresponding value of the conditional expression (2) is lower than the lower limit, dispersion becomes too large, and differences in field curvature and coma aberrations due to colors are increased. Therefore, it becomes difficult to correct the field curvature and coma aberrations by the negative meniscus lens L12 and following lenses. In order to ensure the effects of the present embodiment, the lower limit of the conditional expression (2) may preferably be 25.

The immersion microscope objective lens OL of the present embodiment may satisfy a following conditional expression (2A) instead of above described conditional expression (2).

$$20 \leq v1m \leq 40 \tag{2A}$$

The conditional expression (2A) is also a conditional expression for defining an appropriate Abbe number of the glass material used for the negative meniscus lens L12. If the corresponding value of the conditional expression (2A) is lower than the lower limit, dispersion becomes too large, and differences in field curvature and coma aberrations due to colors are increased. Therefore, it becomes difficult to correct the field curvature and coma aberrations by the negative meniscus lens L12 and following lenses. In order to ensure the effects of the present embodiment, the lower limit of the conditional expression (2A) may preferably be 25.

If the corresponding value of the conditional expression (2A) is higher than the upper limit, it becomes difficult to vitrify the glass material of the negative meniscus lens L12, and it becomes difficult to maintain stable quality. In order to ensure the effects of the present embodiment, the upper limit of the conditional expression (2A) may preferably be 35.

The immersion microscope objective lens OL of the present embodiment may satisfy a following conditional expression (3).

$$1.40 \leq n1p \leq 1.60 \tag{3},$$

where, n1p: the refractive index of the positive lens L11 with respect to the d-line.

The conditional expression (3) is a conditional expression for defining an appropriate refractive index of the glass material used for the positive lens L11. If the corresponding value of the conditional expression (3) is higher than the upper limit, sufficient negative refractive power cannot be obtained at the cemented surface of the positive lens L11 and the negative meniscus lens L12. As a result, the Petzval sum cannot be sufficiently reduced, and flatness of the image surface is lowered, which is not preferred. In order to ensure the effects of the present embodiment, the upper limit of the conditional expression (3) may preferably be 1.55 and may more preferably be 1.52.

If the corresponding value of the conditional expression (3) is lower than the lower limit, the refractive index difference with the immersion liquid increases, and, due to the refraction at the interface with the immersion liquid, high-order spherical aberrations and coma aberrations readily occur. In order to ensure the effects of the present embodiment, the lower limit of the conditional expression (3) may preferably be 1.45.

The immersion microscope objective lens OL of the present embodiment may satisfy following conditional expressions (4) and (5), $$0.3 < (d0+d1p)/(-r1c) < 1.8 \qquad (4)$$

and $$0.8 < (-r1m)/d1m < 1.7 \qquad (5),$$

where, d0: the distance from the object to an object-side lens surface of the positive lens L11 along the optical axis, d1p: the thickness of the positive lens L11 along the optical axis, d1m: the thickness of the negative meniscus lens L12 along the optical axis, r1c: the radius of curvature of the cemented surface of the positive lens L11 and the negative meniscus lens L12, where convex toward the object is positive, and r1m: the radius of curvature of the image-side lens surface of the negative meniscus lens L12, where convex toward the object is positive.

The conditional expression (4) is the conditional expression for defining an appropriate proportion of the radius of curvature of the cemented surface of the positive lens L11 and the negative meniscus lens L12 to the distance from the object to the cemented surface. If the corresponding value of the conditional expression (4) is higher than the upper limit, the radius of curvature of the cemented surface of the positive lens L11 and the negative meniscus lens L12 becomes too small, and the effective diameter of off-axis light flux cannot be satisfied in a large field view, which causes shading in the periphery of the field view. In order to ensure the effects of the present embodiment, the upper limit of the conditional expression (4) may preferably be 1.3.

If the corresponding value of the conditional expression (4) is lower than the lower limit, the radius of curvature of the cemented surface of the positive lens L11 and the negative meniscus lens L12 becomes too large, the Petzval sum cannot be sufficiently reduced, and it becomes difficult to correct field curvature and astigmatism. In order to ensure the effects of the present embodiment, the lower limit of the conditional expression (4) may preferably be 0.4.

The conditional expression (5) is a conditional expression for defining an appropriate proportion of the radius of curvature of the image-side lens surface of the negative meniscus lens L12 to the thickness of the negative meniscus lens L12 along the optical axis. If the corresponding value of the conditional expression (5) is higher than the upper limit, the radius of curvature of the image-side lens surface of the negative meniscus lens L12 becomes large, and the light flux from the object is excessively expanded. If expansion of the light flux is to be suppressed, the radii of curvature of the lens surfaces of the positive meniscus lens L13 have to be reduced, and it becomes difficult to prepare the positive meniscus lens L13. In order to ensure the effects of the present embodiment, the upper limit of the conditional expression (5) may preferably be 1.5.

If the corresponding value of the conditional expression (5) is lower than the lower limit, the radius of curvature of the image-side lens surface of the negative meniscus lens L12 becomes too small, it becomes difficult to correct particularly high-order components of coma aberrations, and it becomes difficult to expand the field view. In order to ensure the effects of the present embodiment, the lower limit of the conditional expression (5) may preferably be 0.9.

The immersion microscope objective lens OL of the present embodiment may satisfy following conditional expressions (6) and (7), $$4.0 < NA \times f < 15.0 \qquad (6)$$

and $$0.03 < d0/f < 0.20 \qquad (7),$$

where, f: the focal length of the immersion microscope objective lens OL,

NA: the object-side numerical aperture of the immersion microscope objective lens OL, and d0: the distance from the object to the object-side lens surface of the positive lens L11 along the optical axis.

The conditional expression (6) is a conditional expression related to the field view and image brightness which can be observed by the microscope. If the corresponding value of the conditional expression (6) is lower than the lower limit, the magnification of the immersion microscope objective lens inevitably increases, and the field view which can be observed is narrowed. In order to ensure the effects of the present embodiment, the lower limit of the conditional expression (6) may preferably be 5.0 and more preferably be 6.0.

If the corresponding value of the conditional expression (6) is higher than the upper limit, although a bright image can be obtained with a larger field view, the immersion microscope objective lens becomes large, and it becomes difficult to maintain the same focal length as other immersion objective lenses. In order to ensure the effects of the present embodiment, the upper limit of the conditional expression (6) may preferably be 12.0 and more preferably be 10.0.

The conditional expression (7) is a conditional expression for defining an appropriate working distance. If the corresponding value of the conditional expression (7) is lower than the lower limit, a sufficient working distance for observing the inside of a thick sample cannot be obtained. In order to ensure the effects of the present embodiment, the lower limit of the conditional expression (7) may preferably be 0.05 and more preferably be 0.06.

If the corresponding value of the conditional expression (7) is higher than the upper limit, in a case in which the immersion microscope objective lens is used for an inverted microscope or the like, it is difficult to maintain the immersion liquid particularly when a stage is largely moved, and usability is lowered. In order to ensure the effects of the present embodiment, the upper limit of the conditional expression (7) may preferably be 0.15 and more preferably be 0.13.

The immersion microscope objective lens OL of the present embodiment may consist of, disposed in order from the object, a first lens group G1 having positive refractive power, a second lens group G2 having positive refractive power, and a third lens group G3 having negative refractive power. The first lens group G1 consists of, disposed in order from the object, the positive lens L11, the negative meniscus lens L12, and the positive meniscus lens L13.

The second lens group G2 has a function to subject the light flux from the first lens group G1, which is still in a diverging state, to aberration correction and, at the same time, gradually convert it to converged light flux. The second lens group G2 has at least two cemented lenses. At the first lens group G1, various aberrations such as spherical aberrations and chromatic aberrations are still remaining.

Therefore, these aberrations are mainly corrected by the cemented lenses of or following the lens group G2.

Note that, regarding chromatic aberrations, in addition to correction of chromatic aberrations by 2 wavelengths, occurrence of secondary spectra has to be suppressed as much as possible. Therefore, both of the positive lenses and the negative lenses constituting the cemented lenses of the second lens group G2 are desired to be formed of glass materials having abnormal dispersibility. However, not many of the glass materials of negative lenses having abnormal dispersibility have large dispersion. Therefore, the second lens group G2 requires the plurality of cemented lenses in order to correct primary chromatic aberrations. The cemented lens of the second lens group G2 is not limited to a cemented lens formed by cementing two lenses, but usage of a cemented lens formed by cementing three lenses is also effective.

The third lens group G3 has a function to convert the converged light flux, which is from the second lens group G2, to parallel light flux and guide it to a later-described image forming lens. The third lens group G3 has a first opposing negative lens L34 having an image-side lens surface with a concave surface facing the image side and has a second opposing negative lens L35 disposed to be opposed to the image side of the first opposing negative lens L34 and having an object-side lens surface with a concave surface facing the object. In the third lens group G3, as a result of disposing the lenses (the first opposing negative lens L34 and the second opposing negative lens L35) of a so-called Gauss type, in which the concave surfaces having comparatively strong refractive power are opposed to each other, the Petzval sum can be reduced so as to complement the first lens group G1.

In the immersion microscope objective lens OL of the present embodiment, the third lens group G3 has a second opposing positive lens L36 cemented to the image side of the second opposing negative lens L35. The image-side lens surface of the second opposing positive lens L36 has a concave surface facing the object. And, the objective lens may satisfy following conditional expressions (8) and (9), $$1.70 \leq n3p \leq 2.00 \quad (8)$$ and $$25 \leq v3p \leq 45 \quad (9),$$

where, n3p: a refractive index of the second opposing positive lens L36 with respect to the d-line, and
v3p: the Abbe number of the second opposing positive lens L36.

The conditional expression (8) is a conditional expression for defining an appropriate refractive index of the glass material used for the second opposing positive lens L36, which is disposed to be nearest to the image side in the third lens group G3. In order to maintain the same refractive power under the condition in which the corresponding value of the conditional expression (8) is lower than the lower limit, the radius of curvature of the second opposing positive lens L36 has to be reduced. As a result, coma aberrations readily occur, and it becomes difficult to reduce the Petzval sum by the first opposing negative lens L34 and the second opposing negative lens L35. In order to ensure the effects of the present embodiment, the lower limit of the conditional expression (8) may preferably be 1.80.

If the corresponding value of the conditional expression (8) is higher than the upper limit, the transmission of the light in the short wavelength side is lowered, which is not preferred. In order to ensure the effects of the present embodiment, the upper limit of the conditional expression (8) may preferably be 1.96 and more preferably be 1.92.

The conditional expression (9) is a conditional expression for defining an appropriate Abbe number of the glass material used for the second opposing positive lens L36. If the corresponding value of the conditional expression (9) is higher than the upper limit, it becomes difficult to correct the chromatic aberration of magnification. In order to ensure the effects of the present embodiment, the upper limit of the conditional expression (9) may preferably be 40.

If the corresponding value of the conditional expression (9) is lower than the lower limit, it becomes difficult to suppress the secondary spectra of the chromatic aberration of magnification. In order to ensure the effects of the present embodiment, the lower limit of the conditional expression (9) may preferably be 30.

In the immersion microscope objective lens OL of the present embodiment, the third lens group G3 may consist of, disposed in order from the object, a first cemented lens, a second cemented lens, and a third cemented lens; the second cemented lens may consist of the first opposing negative lens L34 and a first opposing positive lens L33 cemented to the object side of the first opposing negative lens L34; and the third cemented lens may consist of the second opposing negative lens L35 and a second opposing positive lens L36 cemented to the image side of the second opposing negative lens L35. In the third lens group G3, the light flux is narrowed by the first opposing positive lens L33 and the second opposing positive lens L36 in the front and rear, wherein the first opposing negative lens L34 and the second opposing negative lens L35 having the concave surfaces with comparatively high refractive power opposed to each other are disposed. Therefore, the Petzval sum can be reduced so as to complement the first lens group G1.

In the immersion microscope objective lens OL of the present embodiment, the distance between the second lens group G2 and the third lens group G3 may be variable depending on the thickness of a cover glass C. The light flux height difference of the light flux converged by the second lens group G2 is comparatively increased by the air distance between the second lens group G2 and the third lens group G3. When the air distance between the second lens group G2 and the third lens group G3 is varied, it functions as a so-called correction collar, and the spherical aberration, which varies depending on the thickness of the cover glass C, can be corrected. Note that, as described above, in the third lens group G3, the first cemented lens may be disposed between the cemented lenses, which include the first opposing negative lens L34 and the second opposing negative lens L35 (the second cemented lens and the third cemented lens), and the second lens group G2. As a result, the incident height of the rays, which are incident on the third lens group G3, does not become excessively low, and the spherical aberration can be corrected well when the air distance between the second lens group G2 and the third lens group G3 is varied.

In the immersion microscope objective lens OL of the present embodiment, as the glass material of the negative meniscus lens L12 (will be referred to as glass for the lens L12 hereinafter for explanatory convenience), optical glass containing $B^{3+}$, $La^{3+}$, and, arbitrarily, $Nb^{5+}$ as cationic components is used. For example, the glass for the lens L12 of the present embodiment contains $B^{3+}$ at a percentage of 10 cat % or higher and 50 cat % or lower in the percentage (shown by cation %) with respect to all the cationic components contained in the glass. The glass for the lens L12 contains $Nb^{5+}$ at a percentage of 0 cat % or higher and 40 cat % or lower in the percentage with respect to all the cationic components contained in the glass. If $Nb^{5+}$ is contained, the glass for the lens L12 contains $La^{3+}$, which is a rare-earth ion, at a percentage of 40 cat % or higher and 65 cat % or lower, preferably at a percentage of 50 cat % or higher and 65 cat % or lower, and more preferably at a percentage of 54 cat % or higher and 65 cat % or lower in the percentage with respect to all the cationic components contained in the glass. On the other hand, if the glass for the lens L12 does not contain $Nb^{5+}$, the glass contains $La^{3+}$ at a percentage of 40 cat % or higher and 63 cat % or lower and preferably at a percentage of 50 cat % or higher and 63 cat % or lower. The total percentage of $B^{3+}$, $La^{3+}$, and $Nb^{5+}$ in the glass for the lens L12 is 80 cat % or higher and 100 cat % or lower in the percentage with respect to all the cationic components contained in the glass.

Note that cation % (cat %) shows the percentage of the number of any of the cations with respect to the total number of cations such as the number of $B^{3+}$, the number of $La^{3+}$, and the number of $Nb^{5+}$. For example, the cation % of $La^{3+}$ in the case in which only $B^{3+}$, $La^{3+}$, and $Nb^{5+}$ are contained as the cationic components is the percentage of the number of $La^{3+}$ with respect to the total of the number of $B^{3+}$, the number of $La^{3+}$, and the number of $Nb^{5+}$. The raw materials of such optical glass can be selected, for example, from publicly known materials such as oxides, hydroxides, carbonates, nitrates, and sulfates containing above described cationic components such as $B_2O_3$, $La_2O_3$, $Nb_2O_5$, etc., in accordance with preparation conditions of the glass. Such optical glass can be manufactured by floating dissolution method (for example, see Japanese Laid-Open Patent Publication No. 2014-196236 (A)). Specifically, the glass can be manufactured by irradiating a sample with laser of a carbon dioxide gas or the like to fuse the sample by using a laser levitation furnace, causing the fused matter to float by the fluid of a floating gas jetted out from a nozzle, and then solidify it by cooling. The floating gas is only required to be able to float the sample, and the gas can be arbitrarily selected from inert gases typified by air, nitrogen, oxygen, argon, etc. and dry air, etc. depending on its use. The levitation melting is also referred to as non-container coagulation method, which is a method to obtain glass by heating and fusing a material and then solidify it by cooling without using a container of, for example, a Pt alloy (Pt or a platinum alloy, wherein, for example, Pt—Au, Pt—Au—Rh, or the like is used). Note that, such optical glass can be prepared not only by levitation melting, but also in a gravity-free state.

As a specific example of the glass for the lens L12, for example, if $B^{3+}$ is 10 cat %, $La^{3+}$ is 60 cat %, and $Nb^{5+}$ is 30 cat %, the glass for the lens L12 having n1m=2.12040 and v1m=26.12 can be obtained by the above described levitation melting. If $B^{3+}$ is $La^{3+}$ is 40 cat %, and $Nb^{5+}$ is 40 cat %, the glass for the lens L12 having n1m=2.17005 and v1m=21.73 can be obtained by the above described levitation melting. If $B^{3+}$ is 20 cat %, $La^{3+}$ is 20 cat %, and $Nb^{5+}$ is 20 cat %, the glass for the lens L12 having n1m=2.05013 and v1m=30.25 can be obtained by the above described levitation melting. In this manner, by appropriately adjusting the percentage of $B^{3+}$, $La^{3+}$, $Nb^{5+}$, etc. within the range of the percentage with respect to all the cationic components contained in the above described glass, the glasses for the lens L12, which are shown as examples in later-described Examples 1 to 4 and have high refractive indexes, can be obtained.

Figure 10:
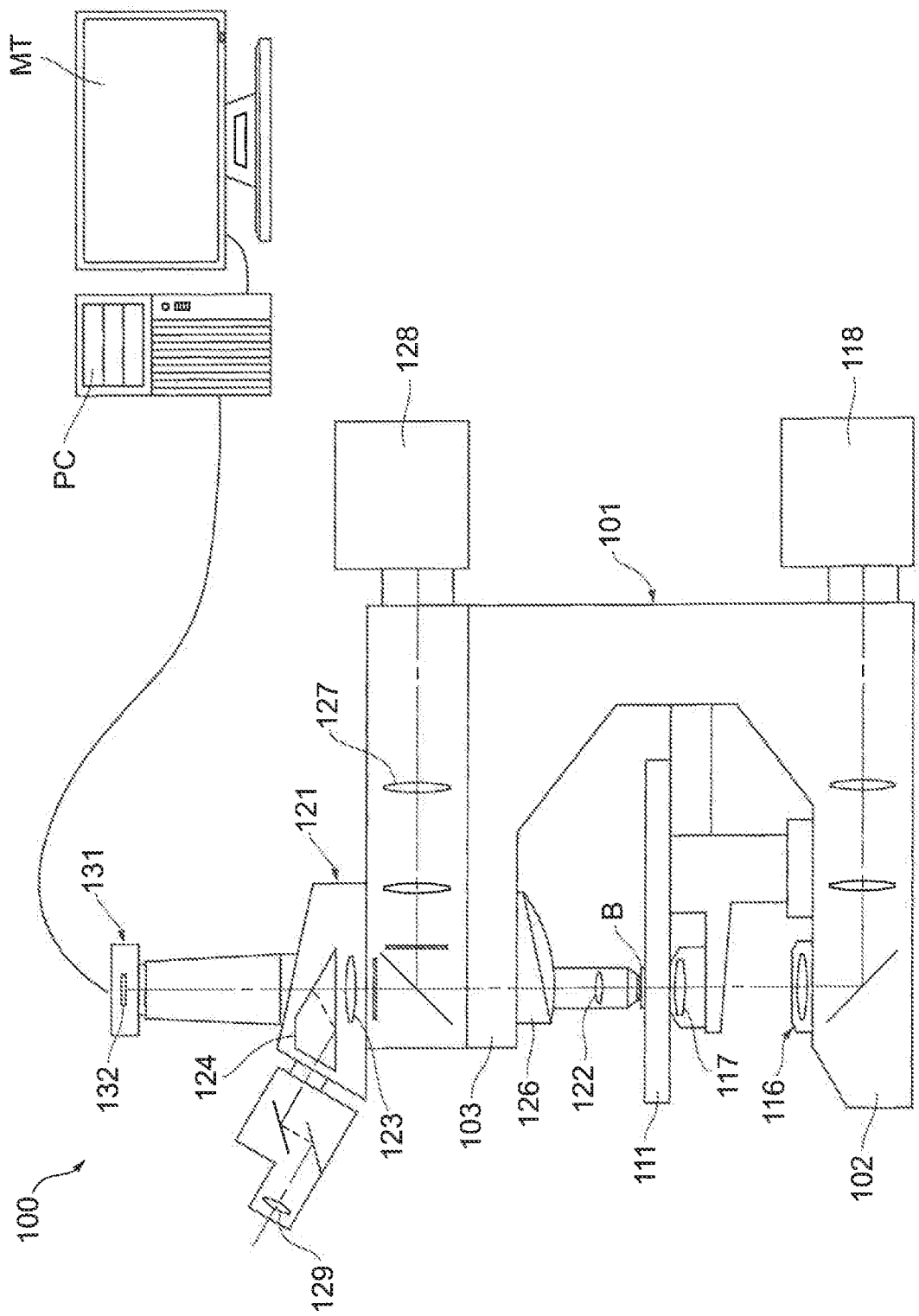
FIG. 10 is a schematic view of a main part of a microscope having an immersion microscope objective lens.

A microscope of the present embodiment comprises the immersion microscope objective lens OL having the above described configuration. As a specific example thereof, a microscope (immersion microscope) having the immersion microscope objective lens OL according to the present embodiment will be described based on FIG. 10. This microscope 100 comprises a stand 101, a stage 111 attached to a base part 102 of the stand 101, a lens barrel 121 attached to the arm part 103 of the stand 101, and an imaging part 131 coupled to the lens barrel 121. An unshown observation object (for example, a biological sample) retained between a slide glass B and a cover glass C (denotation thereof is omitted in FIG. 10) is placed on a stage 111. A condenser lens 117, which constitutes a transmitting illuminator 116, is attached below the stage 111. Note that, in addition to the stage 111, the above described transmitting illuminator 116, a transmitting illuminator light source 118, etc. are attached to the base part 102 of the stand 101.

An objective lens 122 is attached to a revolver 126 provided below the lens barrel 121. The space between the front end of the objective lens 122 and the cover glass C is configured to be filled with immersion liquid. The immersion microscope objective lens OL according to the present embodiment is used as the objective lens 122 attached below the lens barrel 121. The lens barrel 121 is provided with an image forming lens 123 and a prism 124. A later-described image forming lens IL is used as the image forming lens 123 provided in the lens barrel 121. Note that, a shot fluorescence equipment 127, a shot fluorescence light source 128, an eyepiece 129, etc. are attached to the lens barrel 121. The imaging part 131 is provided with an imaging element 132.

In this microscope 100, the light from the observation object transmits through the cover glass C and the immersion liquid, the objective lens 122, the image forming lens 123, and the prism 124 and reaches the imaging element 132. The image of the observation object is formed on an image surface of the imaging element 132 by the image forming lens 123, and the image of the observation object is formed by the imaging element 132. The image of the observation object formed and obtained by the imaging element 132 is displayed by a monitor MT via an external computer PC. The image data of the observation object formed and obtained by the imaging element 132 can be subjected to various image processing by the external computer PC. According to such a configuration, when it is equipped with the immersion microscope objective lens OL according to the above described embodiment, the microscope having a large field view and a sufficient working distance, wherein optical performance is good even at the periphery of the field view, can be obtained. Note that the microscope 100 may be an upright microscope or may be an inverted microscope.

EXAMPLES

Hereinafter, immersion microscope objective lenses OL according to Examples of the present embodiment will be described based on drawings. The immersion microscope objective lenses OL according to Examples are designed as those of an oil immersion (silicone oil) type. The refractive index of the immersion liquid (oil) to be used with respect to the d-line (wavelength λ=587.56 nm) is ndA, and the Abbe number based on the d-line is vdA, where ndA is 1.404074, and vdA is 51.96. The refractive index of a cover glass to be used with respect to the d-line is ndB, the Abbe number thereof based on the d-line is vdB, and the thickness thereof is tc, where ndB is 1.52439, vdB is 54.3, and tc is 0.17 mm.

FIG. 1, FIG. 3, FIG. 5, and FIG. 7 are cross-sectional views showing the configurations of the immersion microscope objective lenses OL {OL (1) to OL (4)} according to Examples 1 to 4. In FIG. 1, FIG. 3, FIG. 5, and FIG. 7, each lens group is represented by the combination of a reference sign G and a number (or alphabet), and each lens is represented by the combination of a reference sign L and a number (or alphabet). Herein, in order to avoid complexity caused by increasing of the types and numbers of the reference signs and numbers, the lenses, etc. are independently denoted in each Example by using the combinations of reference sings and numbers. Therefore, even if the same combinations of reference signs and numbers are used among Examples, it does not mean that they have the same configurations.

Table 1 to Table 4 are shown below, and, among them, Table 1 is the table showing the data of Example 1, Table 2 is the table showing the data of Example 2, Table 3 is the table showing the data of Example 3, and Table 4 is the table showing the data of Example 4. In Examples, the d-line (wavelength λ=587.6 nm), g-line (wavelength λ=435.8 nm), C-line (wavelength λ=656.3 nm), and F-line (wavelength λ=486.1 nm) are selected as the calculation targets of aberration characteristics.

In the tables of [General Data], f represents the focal length of the whole system of the immersion microscope objective lens OL, and β represents magnification. NA represents the object-side numerical aperture of the immersion microscope objective lens OL, and D0 represents the distance from the end face of the cover glass to the lens surface (later described first surface) which is the nearest to the object along the optical axis in the immersion microscope objective lens OL.

In the tables of [Lens Data], surface numbers show the order of lens surfaces from the object, R represents the radii of curvature corresponding to respective surface numbers (the value is positive if the lens surface is convex toward the object), D represents the lens thicknesses or air distances corresponding to respective surface numbers along the optical axis, nd represents refractive indexes of the glass materials corresponding to respective surface numbers with respect to the d-line (wavelength λ=587.6 nm), and νd represents the d-line-based Abbe numbers of the glass materials corresponding to respective surface numbers. The radius of curvature "∞" represents a flat surface or an aperture. Also, the description of the refractive index nd=1.00000 of air is omitted.

The tables of [Variable Distance Data] of Examples show the distance Di to the next lens surface of a surface number i for which the distance to the next lens surface is "variable" in the table showing [Lens Data]. For example, in Example 1, the distance D14 of the surface number 14 to the next lens surface is shown. Note that, the table of [Variable Distance Data] shows the value of the variable distance corresponding to the thickness tc of the cover glass.

The tables of [Conditional Expression Corresponding Values] show the values corresponding to above described Conditional Expressions (1) to (9).

Hereinafter, for all the data values, generally "mm" is used for the specified focal lengths f, radii of curvature R, the distances D to the next lens surfaces, other lengths, and so on unless otherwise specified. However, the values are not limited thereto since an optical system can achieve equivalent optical performance even when it is proportionally enlarged or proportionally contracted.

The above descriptions about tables are the same in all Examples, and redundant descriptions will be omitted hereinafter.

Example 1

Example 1 will be described by using FIG. 1 to FIG. 2 and Table 1. FIG. 1 is a cross-sectional view showing the configuration of an immersion microscope objective lens according to Example 1 of the present embodiment. The immersion microscope objective lens OL (1) according to Example 1 consists of a first lens group G1 having positive refractive power, a second lens group G2 having positive refractive power, and a third lens group G3 having negative refractive power, wherein the lens groups are disposed in order from the object.

The first lens group G1 consists of, disposed in order from the object, a cemented lens, which consists of a plano-convex positive lens L11 and a negative meniscus lens L12 having a concave surface facing the object, and a positive meniscus lens L13 having a concave surface facing the object. A cover glass C is disposed in the object side of the first lens group G1, and the space between the cover glass C and the positive lens L11 is filled with immersion liquid (oil).

The second lens group G2 consists of, disposed in order from the object, a first cemented lens, which consists of a first biconcave negative lens L21 and a first biconvex positive lens L22; a second biconvex positive lens L23, which is a single lens; and a second cemented lens, which consists of a third biconvex positive lens L24, a second biconcave negative lens L25, and a fourth biconvex positive lens L26.

The third lens group G3 consists of, disposed in order from the object, a first cemented lens, which consists of a meniscus negative lens L31 having a convex surface facing the object and a biconvex positive lens L32; a second cemented lens, which consists of a first biconvex opposing positive lens L33 and a first biconcave opposing negative lens L34; and a third cemented lens, which consists of a second meniscus opposing negative lens L35 having a concave surface facing the object and a second meniscus opposing positive lens L36 having a concave surface facing the object. The immersion microscope objective lens OL (1) according to Example 1 is configured to fix the first lens group G1 and the second lens group G2 and move the third lens group G3 along the optical axis so that the distance between the second lens group G2 and the third lens group G3 is varied when a spherical aberration is to be corrected depending on the thickness of the cover glass C. For example, if the thickness of the cover glass C is thinner than a preset (tc=0.17 mm), in order to correct the spherical aberration, the third lens group G3 is moved toward the object along the optical axis to reduce the distance between the second lens group G2 and the third lens group G3.

Following Table 1 shows the data values of the immersion microscope objective lens according to Example 1.

TABLE 1

[General Data]

f = 8
β = −25 times
NA = 1.05
D0 = 1.0

[Lens Data]

| Surface Number | R | D | nd | νd |
|---|---|---|---|---|
| 1 | ∞ | 1 | 1.458504 | 67.85 |
| 2 | −1.6917 | 4.6 | 2.10465 | 26.82 |
| 3 | −5.8782 | 0.2 | | |
| 4 | −19.7986 | 3.7 | 1.65844 | 50.84 |
| 5 | −9.5255 | 0.2 | | |
| 6 | −340.9344 | 1.2 | 1.60311 | 60.69 |
| 7 | 23.1069 | 6.3 | 1.433852 | 95.25 |
| 8 | −18.1464 | 0.2 | | |
| 9 | 28.0616 | 4.2 | 1.49782 | 82.57 |

TABLE 1-continued

| | | | | |
|---|---|---|---|---|
| 10 | −110.9233 | 0.2 | | |
| 11 | 46.4149 | 5.5 | 1.49782 | 82.57 |
| 12 | −22.0759 | 1.2 | 1.552981 | 55.07 |
| 13 | 17.3694 | 6.7 | 1.43425 | 95.02 |
| 14 | −26.3871 | D14 (Variable) | | |
| 15 | 170.9939 | 1 | 1.80000 | 29.84 |
| 16 | 15.3018 | 4.5 | 1.433852 | 95.25 |
| 17 | −65.1090 | 0.2 | | |
| 18 | 11.3951 | 5.6 | 1.49782 | 82.57 |
| 19 | −32.9665 | 1.9 | 1.73211 | 46.18 |
| 20 | 10.2318 | 7.9 | | |
| 21 | −8.1158 | 1.3 | 1.48749 | 70.31 |
| 22 | −48.0409 | 3.75 | 1.85026 | 32.35 |
| 23 | −13.3821 | | | |

[Variable Distance Data]

| tc | 0.11 | 0.17 | 0.23 |
|---|---|---|---|
| D14 | 1.331 | 1.400 | 1.472 |

[Conditional Expression Corresponding Value]

Conditional Expression (1) n1m = 2.10465
Conditional Expression (2), (2A) υ1m = 26.818
Conditional Expression (3) n1p = 1.458504
Conditional Expression (4) (d0 + d1p)/(−r1c) = 1.18224
Conditional Expression (5) (−r1m)/d1m = 1.27786
Conditional Expression (6) NA × f = 8.4
Conditional Expression (7) d0/f = 0.125
Conditional Expression (8) n3p = 1.85026
Conditional Expression (9) υ3p = 32.353

Figure 2:
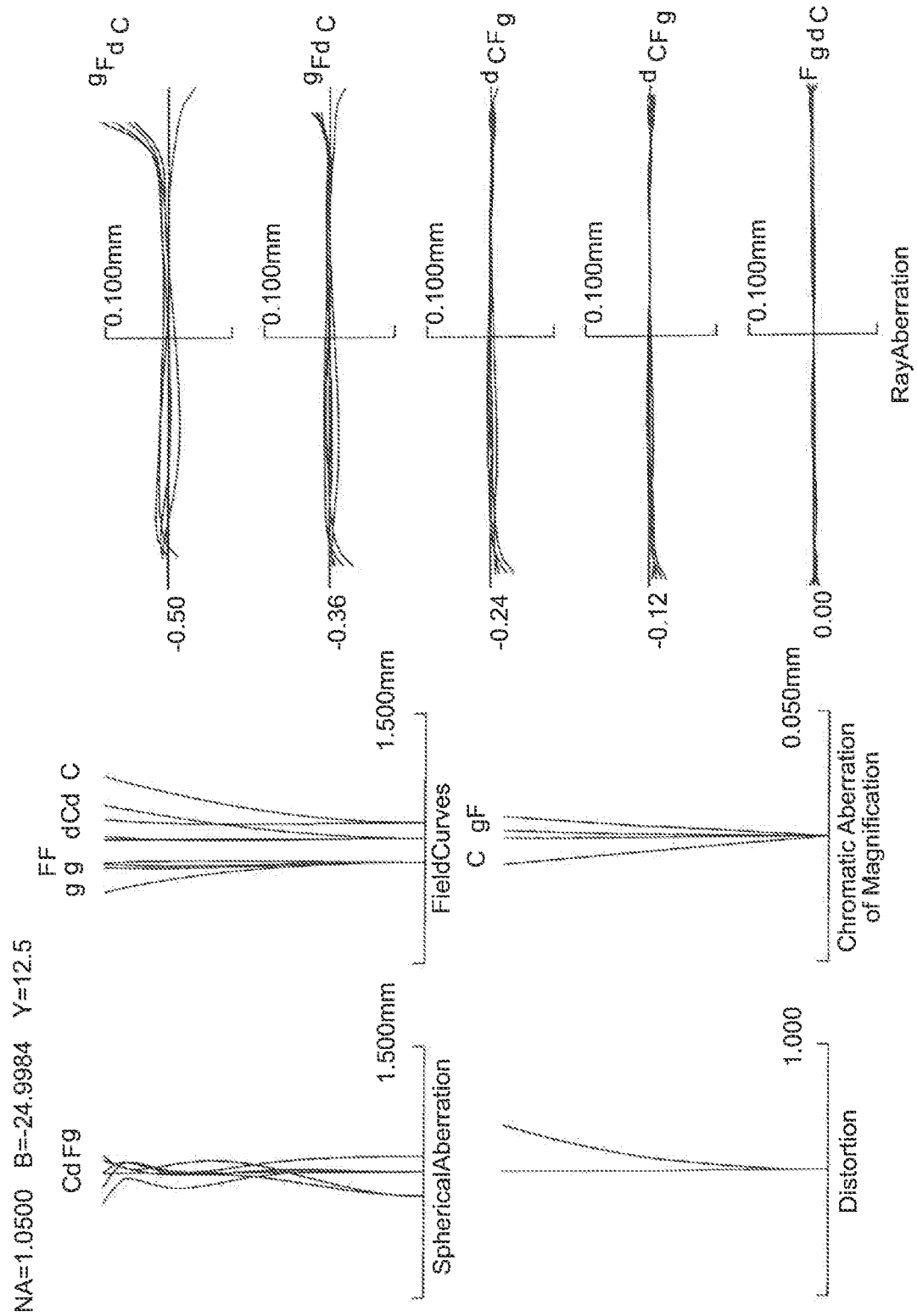
FIG. 2 shows various aberration graphs of the immersion microscope objective lens according to Example 1.

FIG. 2 shows graphs of various aberrations (a graph of spherical aberrations, a graph of field curvature aberrations, a distortion graph, a graph of chromatic aberration of magnifications, and a graph of ray aberrations) of the immersion microscope objective lens according to Example 1. In the aberration graphs of FIG. 2, NA represents a numerical aperture, B represents magnification, Y represents an image height, and various aberrations with respect to the d-line (wavelength λ=587.6 nm), the g-line (wavelength λ=435.8 nm), the C-line (wavelength λ=656.3 nm), and the F-line (wavelength λ=486.1 nm) are represented by d, g, C, and F, respectively. Note that the same reference signs as those of present Example are used also in the aberration graphs of Examples shown below, and redundant description will be omitted.

According to the aberration graphs, it can be understood that the immersion microscope objective lens according to Example 1 corrects various aberrations well and has excellent image forming performance.

Example 2

Example 2 will be described by using FIG. 3 to FIG. 4 and Table 2. FIG. 3 is a cross-sectional view showing the configuration of an immersion microscope objective lens according to Example 2 of the present embodiment. The immersion microscope objective lens OL (2) according to Example 2 consists of a first lens group G1 having positive refractive power, a second lens group G2 having positive refractive power, and a third lens group G3 having negative refractive power, wherein the lens groups are disposed in order from the object.

The first lens group G1 consists of, disposed in order from the object, a cemented lens, which consists of a plano-convex positive lens L11 and a negative meniscus lens L12 having a concave surface facing the object, and a positive meniscus lens L13 having a concave surface facing the object. A cover glass C is disposed in the object side of the first lens group G1, and the space between the cover glass C and the positive lens L11 is filled with immersion liquid (oil).

The second lens group G2 consists of, disposed in order from the object, a first meniscus positive lens L21, which is a single lens having a concave surface facing the object; a first cemented lens, which consists of a second biconvex positive lens L22 and a first meniscus negative lens L23 having a concave surface facing the object; and a second cemented lens, which consists of a third biconvex positive lens L24, a second biconcave negative lens L25, and a fourth biconvex positive lens L26.

The third lens group G3 consists of, disposed in order from the object, a first cemented lens, which consists of a meniscus negative lens L31 having a convex surface facing the object and a biconvex positive lens L32; a second cemented lens, which consists of a first biconvex opposing positive lens L33 and a first biconcave opposing negative lens L34; and a third cemented lens, which consists of a second meniscus opposing negative lens L35 having a concave surface facing the object and a second meniscus opposing positive lens L36 having a concave surface facing the object. The immersion microscope objective lens OL (2) according to Example 2 is configured to fix the first lens group G1 and the second lens group G2 and move the third lens group G3 along the optical axis so that the distance between the second lens group G2 and the third lens group G3 is varied when a spherical aberration is to be corrected depending on the thickness of the cover glass C. For example, if the thickness of the cover glass C is thinner than a preset (tc=0.17 mm), in order to correct the spherical aberration, the third lens group G3 is moved toward the object along the optical axis to reduce the distance between the second lens group G2 and the third lens group G3.

Following Table 2 shows the data values of the immersion microscope objective lens according to Example 2.

TABLE 2

[General Data]

f = 8
β = −25 times
NA = 1.1
D0 = 0.6

[Lens Data]

| Surface Number | R | D | nd | υd |
|---|---|---|---|---|
| 1 | ∞ | 0.8 | 1.458504 | 67.85 |
| 2 | −1.4415 | 3.75 | 2.16121 | 25.83 |
| 3 | −5.2189 | 0.2 | | |
| 4 | −12.0414 | 3.5 | 1.59319 | 67.90 |
| 5 | −7.5676 | 0.2 | | |
| 6 | −238.8473 | 4.2 | 1.49782 | 82.57 |
| 7 | −14.3660 | 0.2 | | |
| 8 | 31.6700 | 6 | 1.433852 | 95.25 |
| 9 | −16.9703 | 1.1 | 1.6968 | 55.52 |
| 10 | −36.7883 | 0.3 | | |
| 11 | 28.6744 | 5.7 | 1.49782 | 82.57 |
| 12 | −23.2638 | 1.2 | 1.552981 | 55.07 |
| 13 | 15.2502 | 6.4 | 1.43425 | 95.02 |
| 14 | −28.4525 | D14 (Variable) | | |
| 15 | 64.1476 | 1.1 | 1.83481 | 42.73 |
| 16 | 12.1897 | 5.4 | 1.433852 | 95.25 |
| 17 | −35.3961 | 0.2 | | |
| 18 | 11.6946 | 4.95 | 1.49782 | 82.57 |
| 19 | −51.7642 | 2 | 1.73211 | 46.18 |
| 20 | 11.0936 | 7.2 | | |

TABLE 2-continued

| 21 | −8.4881 | 3.9 | 1.48749 | 70.31 |
| 22 | −33.2658 | 3.6 | 1.90265 | 35.73 |
| 23 | −15.0939 | | | |

[Variable Distance Data]

| tc | 0.11 | 0.17 | 0.23 |
| D14 | 1.200 | 1.300 | 1.410 |

[Conditional Expression Corresponding Value]

Conditional Expression (1) n1m = 2.16121
Conditional Expression (2), (2A) υ1m = 25.827
Conditional Expression (3) n1p = 1.458504
Conditional Expression (4) (d0 + d1p)/(−r1c) = 0.97121
Conditional Expression (5) (−r1m)/d1m = 1.39169
Conditional Expression (6) NA × f = 8.8
Conditional Expression (7) d0/f = 0.075
Conditional Expression (8) n3p = 1.90265
Conditional Expression (9) υ3p = 35.726

Figure 4:
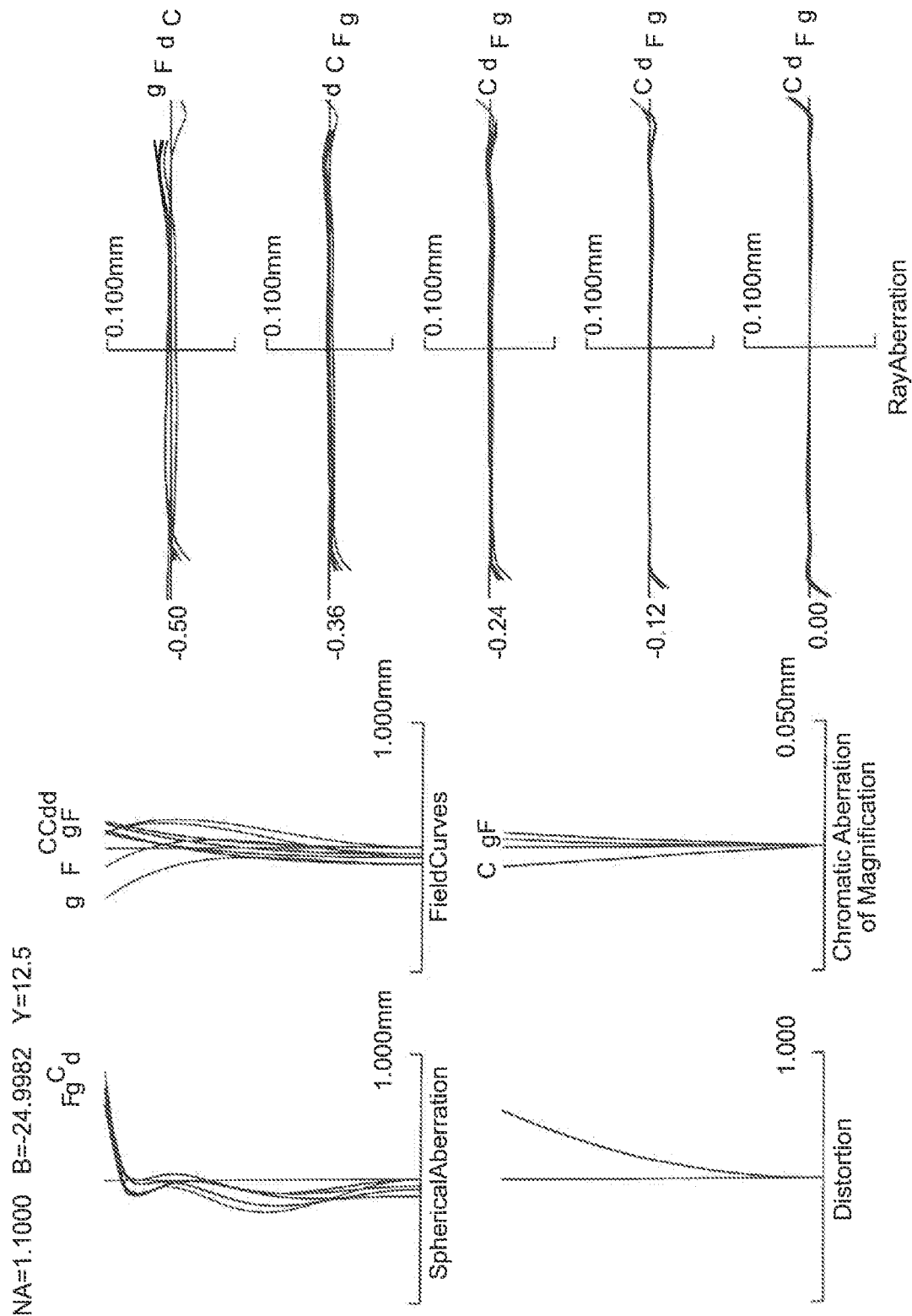
FIG. 4 shows various aberration graphs of the immersion microscope objective lens according to Example 2.

FIG. 4 shows various aberration graphs of the immersion microscope objective lens according to Example 2. According to the various aberration graphs, it can be understood that the immersion microscope objective lens according to Example 2 corrects various aberrations well and has excellent image forming performance.

Example 3

Example 3 will be described by using FIG. 5 to FIG. 6 and Table 3. FIG. 5 is a cross-sectional view showing the configuration of an immersion microscope objective lens according to Example 3 of the present embodiment. The immersion microscope objective lens OL (3) according to Example 3 consists of, disposed in order from the object, a first lens group G1 having positive refractive power, a second lens group G2 having positive refractive power, and a third lens group G3 having negative refractive power.

The first lens group G1 consists of, disposed in order from the object, a cemented lens, which consists of a plano-convex positive lens L11 and a negative meniscus lens L12 having a concave surface facing the object, and a positive meniscus lens L13 having a concave surface facing the object. A cover glass C is disposed in the object side of the first lens group G1, and the space between the cover glass C and the positive lens L11 is filled with immersion liquid (oil).

The second lens group G2 consists of, disposed in order from the object, a first meniscus positive lens L21, which is a single lens having a concave surface facing the object; a first cemented lens, which consists of a second biconvex positive lens L22 and a first meniscus negative lens L23 having a concave surface facing the object; a second cemented lens, which consists of a third biconvex positive lens L24, a second biconcave negative lens L25, and a fourth biconvex positive lens L26; and a fifth biconvex positive lens L27, which is a single lens.

The third lens group G3 consists of, disposed in order from the object, a first cemented lens, which consists of a meniscus negative lens L31 having a convex surface facing the object and a biconvex positive lens L32; a second cemented lens, which consists of a first meniscus opposing positive lens L33 having a convex surface facing the object and a first meniscus opposing negative lens L34 having a convex surface facing the object; and a third cemented lens, which consists of a second meniscus opposing negative lens L35 having a concave surface facing the object and a second meniscus opposing positive lens L36 having a concave surface facing the object. The immersion microscope objective lens OL (3) according to Example 3 is configured to fix the first lens group G1 and the second lens group G2 and move the third lens group G3 along the optical axis so that the distance between the second lens group G2 and the third lens group G3 is varied when a spherical aberration is to be corrected depending on the thickness of the cover glass C. For example, if the thickness of the cover glass C is thinner than a preset (tc=0.17 mm), in order to correct the spherical aberration, the third lens group G3 is moved toward the object along the optical axis to reduce the distance between the second lens group G2 and the third lens group G3.

Following Table 3 shows the data values of the immersion microscope objective lens according to Example 3.

TABLE 3

[General Data]

f = 10
β = −20 times
NA = 1.0
D0 = 0.8

[Lens Data]

| Surface Number | R | D | nd | υd |
| --- | --- | --- | --- | --- |
| 1 | ∞ | 0.8 | 1.458504 | 67.85 |
| 2 | −1.6917 | 5.1 | 2.07141 | 31.51 |
| 3 | −6.6973 | 0.2 | | |
| 4 | −15.7704 | 3 | 1.49782 | 82.57 |
| 5 | −9.2937 | 0.2 | | |
| 6 | −139.9761 | 3.6 | 1.56907 | 71.31 |
| 7 | −16.2567 | 0.2 | | |
| 8 | 32.7855 | 5.15 | 1.49782 | 82.57 |
| 9 | −20.2957 | 1 | 1.552981 | 55.07 |
| 10 | −14076.0352 | 0.2 | | |
| 11 | 28.1230 | 5 | 1.49782 | 82.57 |
| 12 | −27.2959 | 1.2 | 1.552981 | 55.07 |
| 13 | 15.8237 | 5.5 | 1.43425 | 95.02 |
| 14 | −44.6855 | 0.2 | | |
| 15 | 73.2814 | 2.3 | 1.45600 | 91.36 |
| 16 | −94.0194 | D16 (Variable) | | |
| 17 | 200.0000 | 1 | 1.816 | 46.62 |
| 18 | 12.5824 | 5.3 | 1.433852 | 95.25 |
| 19 | −42.7005 | 0.2 | | |
| 20 | 13.0672 | 4.3 | 1.49782 | 82.57 |
| 21 | 68.9365 | 1.5 | 1.673 | 38.15 |
| 22 | 12.1997 | 8.8 | | |
| 23 | −10.3253 | 2 | 1.517417 | 52.43 |
| 24 | −73.7506 | 4.5 | 1.90265 | 35.73 |
| 25 | −17.0332 | | | |

[Variable Distance Data]

| tc | 0.11 | 0.17 | 0.23 |
| D16 | 1.750 | 1.800 | 1.851 |

[Conditional Expression Corresponding Value]

Conditional Expression (1) n1m = 2.07141
Conditional Expression (2), (2A) υ1m = 31.511
Conditional Expression (3) n1p = 1.458504
Conditional Expression (4) (d0 + d1p)/(−r1c) = 0.94579
Conditional Expression (5) (−r1m)/d1m = 1.3132
Conditional Expression (6) NA × f = 10
Conditional Expression (7) d0/f = 0.080
Conditional Expression (8) n3p = 1.90265
Conditional Expression (9) υ3p = 35.726

Figure 6:
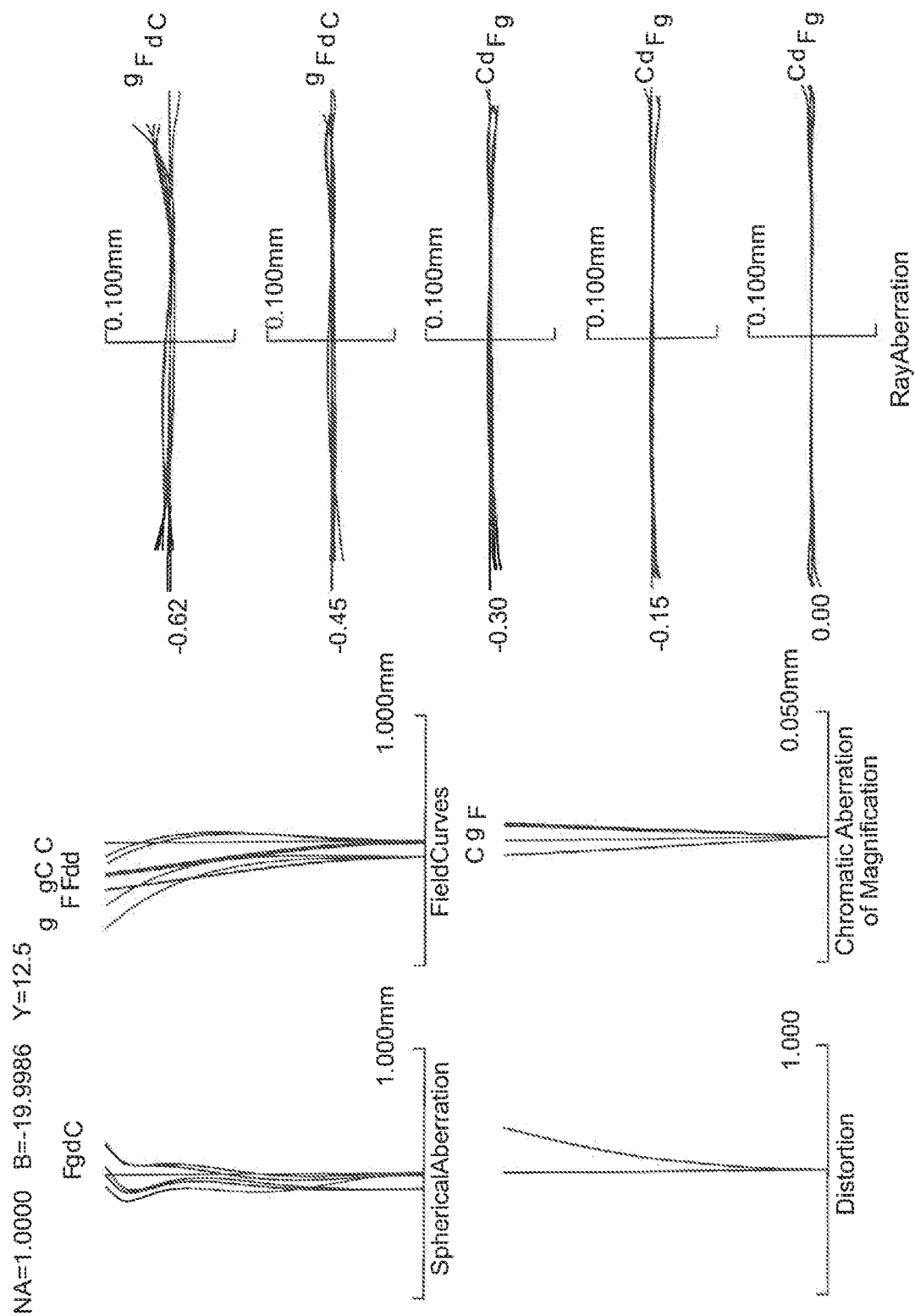
FIG. 6 shows various aberration graphs of the immersion microscope objective lens according to Example 3.

FIG. 6 shows various aberration graphs of the immersion microscope objective lens according to Example 3. According to the various aberration graphs, it can be understood that the immersion microscope objective lens according to Example 3 corrects various aberrations well and has excellent image forming performance.

Example 4

Example 4 will be described by using FIG. 7 to FIG. 8 and Table 4. FIG. 7 is a cross-sectional view showing the configuration of an immersion microscope objective lens according to Example 4 of the present embodiment. The immersion microscope objective lens OL (4) according to Example 4 consists of, disposed in order from the object, a first lens group G1 having positive refractive power, a second lens group G2 having positive refractive power, and a third lens group G3 having negative refractive power.

The first lens group G1 consists of, disposed in order from the object, a cemented lens, which consists of a plano-convex positive lens L11 and a negative meniscus lens L12 having a concave surface facing the object, and a positive meniscus lens L13 having a concave surface facing the object. A cover glass C is disposed in the object side of the first lens group G1, and the space between the cover glass C and the positive lens L11 is filled with immersion liquid (oil).

The second lens group G2 consists of, disposed in order from the object, a first cemented lens, which consists of a first biconcave negative lens L21 and a first biconvex positive lens L22; a second cemented lens, which consists of a second biconcave negative lens L23 and a second biconvex positive lens L24; and a third cemented lens, which consists of a third meniscus negative lens L25 having a convex surface facing the object and a third biconvex positive lens L26.

The third lens group G3 consists of, disposed in order from the object, a first cemented lens, which consists of a biconvex positive lens L31 and a biconcave negative lens L32; a second cemented lens, which consists of a first biconvex opposing positive lens L33 and a first biconcave opposing negative lens L34; and a third cemented lens, which consists of a second meniscus opposing negative lens L35 having a concave surface facing the object and a second meniscus opposing positive lens L36 having a concave surface facing the object. The immersion microscope objective lens OL (4) according to Example 4 is configured to fix the first lens group G1 and the second lens group G2 and move the third lens group G3 along the optical axis so that the distance between the second lens group G2 and the third lens group G3 is varied when a spherical aberration is to be corrected depending on the thickness of the cover glass C. For example, if the thickness of the cover glass C is thinner than a preset (tc=0.17 mm), in order to correct the spherical aberration, the third lens group G3 is moved toward the object along the optical axis to reduce the distance between the second lens group G2 and the third lens group G3.

Following Table 4 shows the data values of the immersion microscope objective lens according to Example 4.

TABLE 4

[General Data]

f = 5
β = -40 times
NA = 1.25
D0 = 0.32

[Lens Data]

| Surface Number | R | D | nd | υd |
|---|---|---|---|---|
| 1 | ∞ | 0.39 | 1.458504 | 67.85 |
| 2 | -1.7124 | 4.5 | 2.07141 | 31.51 |
| 3 | -4.8286 | 0.2 | | |
| 4 | -7.9258 | 2.88 | 1.673 | 38.15 |
| 5 | -6.9675 | 0.2 | | |
| 6 | -191.2221 | 1.03 | 1.61266 | 44.46 |
| 7 | 30.4248 | 6.08 | 1.456 | 91.36 |
| 8 | -13.4399 | 0.2 | | |
| 9 | -541.5427 | 1 | 1.673 | 38.15 |
| 10 | 26.6111 | 7.94 | 1.433852 | 95.25 |
| 11 | -15.0000 | 0.2 | | |
| 12 | 41.1338 | 1 | 1.73211 | 46.18 |
| 13 | 13.4781 | 7.91 | 1.433852 | 95.25 |
| 14 | -21.8423 | D14 (Variable) | | |
| 15 | 18.2759 | 4.69 | 1.43385 | 95.25 |
| 16 | -33.5297 | 1 | 1.73211 | 46.18 |
| 17 | 25.4598 | 0.2 | | |
| 18 | 9.8794 | 5.33 | 1.456 | 91.36 |
| 19 | -214.1266 | 7.98 | 1.76684 | 46.78 |
| 20 | 6.4885 | 5.06 | | |
| 21 | -6.2365 | 1.47 | 1.59349 | 67.02 |
| 22 | -2114.1228 | 3.55 | 1.834 | 37.18 |
| 23 | -10.0340 | | | |

[Variable Distance Data]

| tc | 0.13 | 0.17 | 0.19 |
|---|---|---|---|
| D14 | 0.810 | 0.410 | 0.200 |

[Conditional Expression Corresponding Value]

Conditional Expression (1) n1m = 2.07141
Conditional Expression (2), (2A) υ1m = 31.511
Conditional Expression (3) n1p = 1.458504
Conditional Expression (4) (d0 + d1p)/(-r1c) = 0.41462
Conditional Expression (5) (-r1m)/d1m = 1.07302
Conditional Expression (6) NA × f = 6.25
Conditional Expression (7) d0/f = 0.064
Conditional Expression (8) n3p = 1.834
Conditional Expression (9) υ3p = 37.184

Figure 8:
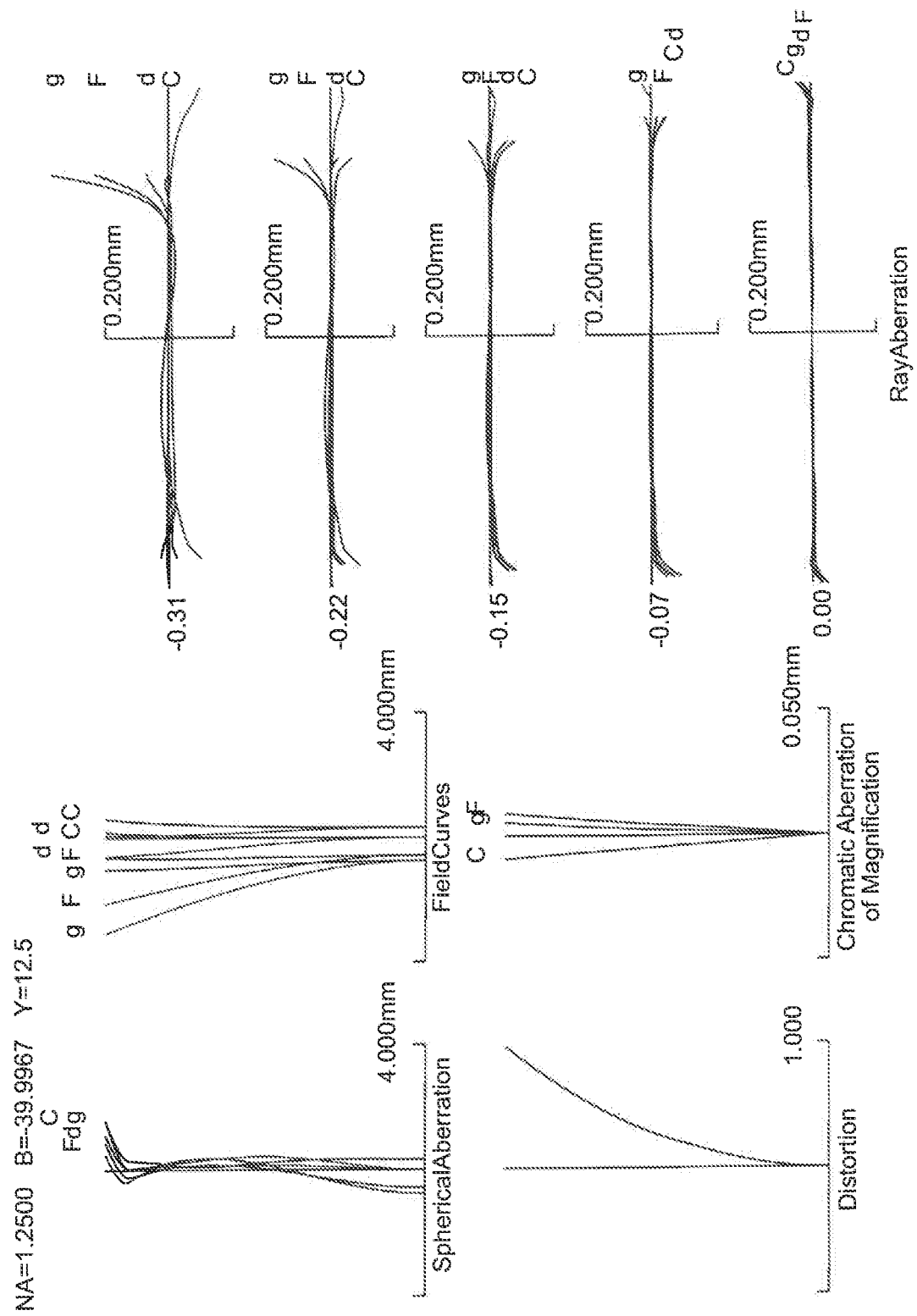
FIG. 8 shows various aberration graphs of the immersion microscope objective lens according to Example 4.

FIG. 8 shows various aberration graphs of the immersion microscope objective lens according to Example 4. According to the various aberration graphs, it can be understood that the immersion microscope objective lens according to Example 4 corrects various aberrations well and has excellent image forming performance.

Figure 9:
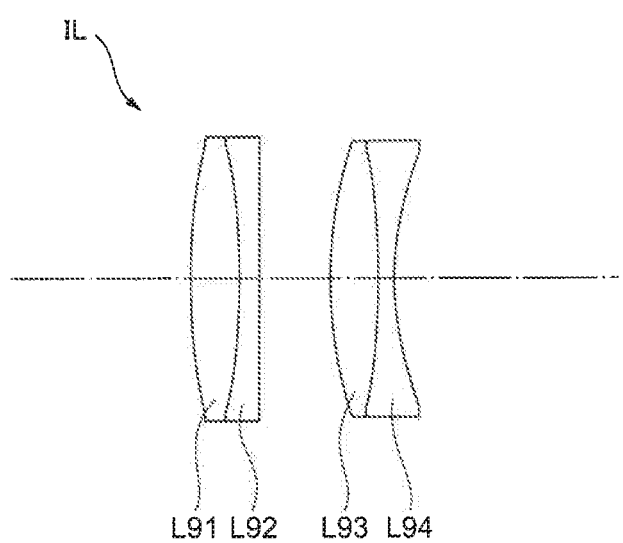
FIG. 9 is a cross-sectional view showing the configuration of an image forming lens.

The immersion microscope objective lenses according to Examples are the infinity correction lenses. Therefore, the lens is used in a mode of a finite-corrected optical system, which is combined with an image forming lens for forming an image of the object. Therefore, an example of the image forming lens used in combination with the immersion microscope objective lens will be described by using FIG. 9 and Table 5. FIG. 9 is a cross-sectional view showing the configuration of the image forming lens used in combination with the immersion microscope objective lens according to any of Examples. The various aberration graphs of the immersion microscope objective lens according to Examples were obtained by using the lens in combination with this image forming lens. The image forming lens IL shown in FIG. 9 consists of, disposed in order from the object, a first cemented lens, which consists of a first biconvex positive lens L91 and a first biconcave negative lens L92, and a second cemented lens, which consists of a second biconvex positive lens L93 and a second biconcave negative lens L94. The image forming lens IL is disposed in the image side of the immersion microscope objective lens according to any of Examples.

Following Table 5 shows the data values of the image forming lens. Note that, in the table of [General Data], fi represents the focal length of the whole system of the image forming lens.

TABLE 5

[General Data]

fi = 200

[Lens Data]

| Surface Number | R | D | nd | νd |
|---|---|---|---|---|
| 1 | 75.0430 | 5.1 | 1.622801 | 57.03 |
| 2 | −75.0430 | 2 | 1.749501 | 35.19 |
| 3 | 1600.5800 | 7.5 | | |
| 4 | 50.2560 | 5.1 | 1.667551 | 41.96 |
| 5 | −84.5410 | 1.8 | 1.612658 | 44.41 |
| 6 | 36.9110 | | | |

According to above described Examples, the immersion microscope objective lenses, which have a large field view and a sufficient working distance and are capable of obtaining good optical performance even at the periphery of the field view while maintaining a comparatively high numerical aperture, can be realized. For example, according to above described Examples, while realizing a high numerical aperture with respect to the working distance, a large field view number can be obtained compared with the immersion microscope objective lens according to above described Patent literature 1.

Herein, above described Examples show specific examples of the present embodiment, and the present embodiment is not limited thereto.

EXPLANATION OF NUMERALS AND CHARACTERS

G1 First Lens Group
G2 Second Lens Group
G3 Third Lens Group
L11 Positive Lens
L12 Negative Meniscus Lens
L13 Positive Meniscus Lens

The invention claimed is:

1. An objective lens consisting of, disposed in order from an object:
a first lens group having positive refractive power and consisting of two lens elements, each of which is either a single lens or a cemented lens;
a second lens group having positive refractive power and consisting of four lens elements, each of which is either a single lens or a cemented lens; and
a third lens group having negative refractive power and consisting of three lens elements, each of which is either a single lens or a cemented lens, wherein:
the objective lens is configured to vary a distance between the second lens group and the third lens group depending on a thickness of a cover glass, the cover glass being disposed on an object side of the first lens group;
the first lens group consists of, disposed in order from the object:
a 1st-group-1st lens element which is a cemented lens that (i) has positive refractive power and (ii) is composed of a positive lens cemented together with a negative meniscus lens having a concave surface facing the object; and
a 1st-group-2nd lens element which is a single lens composed of a positive meniscus lens having a concave surface facing the object;
the second lens group consists of, disposed in order from the object:
a 2nd-group-1st lens element which is a single lens composed of a positive meniscus lens having a concave surface facing the object;
a 2nd-group-2nd lens element which is a cemented lens composed of a positive lens cemented together with a negative meniscus lens having a concave surface facing the object;
a 2nd-group-3rd lens element which is composed of either a single lens or a cemented lens; and
a 2nd-group-4th lens element which is composed of either a single lens of a cemented lens;
two lens elements out of the three lens elements of the third lens group comprise:
a 3rd-group-1st opposing cemented lens composed of a positive lens cemented together with a negative lens having a concave surface facing an image; and
a 3rd-group-2nd opposing cemented lens (i) disposed next to the 3rd-group-1st opposing cemented lens on an image side and (ii) composed of a negative lens having a concave surface facing the object cemented together with a positive lens; and
the following conditional expressions are satisfied:

$$2.05 \leq n1m \leq 2.30;$$

$$20 \leq v1m \leq 35;$$

$$1.80 \leq n3p \leq 2.00; \text{ and}$$

$$30 \leq v3p \leq 45,$$

where:
n1m is a refractive index of the negative meniscus lens of the 1st-group-1st lens element in the first lens group with respect to a d-line;
v1m is an Abbe number of the negative meniscus lens of the 1st-group-1st lens element in the first lens group;
n3p is a refractive index of the negative lens of the 3rd-group-2nd opposing cemented lens with respect to the d-line; and
v3p is an Abbe number of the negative lens of the 3rd-group-2nd opposing cemented lens.

2. The objective lens according to claim 1, wherein a space between the cover glass and the 1st-group-1st lens element is filled with immersion liquid.

3. The objective lens according to claim 1, satisfying the following conditional expression:

$$1.40 \leq n1p \leq 1.60,$$

where n1p is a refractive index of the positive lens of the 1st-group-1st lens element in the first lens group with respect to the d-line.

4. The objective lens according to claim 1, satisfying the following conditional expressions:

$$0.3 < (d0+d1p)/(-r1c) < 1.8; \text{ and}$$

$$0.8 < (-r1m)/d1m < 1.7,$$

where:
d0 is a distance from the object to an object-side lens surface of the positive lens of the 1st-group-1st lens element in the first lens group along an optical axis;
d1p is a thickness of the positive lens of the 1st-group-1st lens element in the first lens group along the optical axis;

d1m is a thickness of the negative meniscus lens of the 1st-group-1st lens element in the first lens group along the optical axis;

r1m is a radius of curvature of an image-side lens surface of the negative meniscus lens of the 1st-group-1st lens element in the first lens group, convex toward the object being positive, and r1c is a radius of curvature of a cemented surface of the positive lens of the 1st-group-1st lens element in the first lens group.

5. The objective lens according to claim 1, satisfying the following conditional expressions:

$$3.0 < NA \times f < 15.0; \text{ and}$$

$$0.03 < d0/f < 0.20,$$

where:

f is a focal length of the objective lens;

NA is an object-side numerical aperture of the objective lens; and d0 is a distance from the object to an object-side lens surface of the positive lens of the 1st-group-1st lens element in the first lens group along an optical axis.

6. An optical system comprising the objective lens according to claim 1 and an image forming lens.

7. A microscope comprising the objective lens according to claim 1.

8. The objective lens according to claim 1, wherein the objective lens is configured to fix the second lens group and to move the third lens group to vary the distance between the second lens group and the third lens group.

\* \* \* \* \*